(12) United States Patent
Mallat

(10) Patent No.: US 8,953,875 B2
(45) Date of Patent: Feb. 10, 2015

(54) MULTISCALE MODULUS FILTER BANK AND APPLICATIONS TO PATTERN DETECTION, CLUSTERING, CLASSIFICATION AND REGISTRATION

(75) Inventor: Stephane Mallat, Paris (FR)

(73) Assignee: Ecole Polytechnique, Palaiseau (FR)

( * ) Notice: Subject to any disclaimer, the term of this patent is extended or adjusted under 35 U.S.C. 154(b) by 107 days.

(21) Appl. No.: 13/698,169

(22) PCT Filed: May 26, 2011

(86) PCT No.: PCT/EP2011/058652
§ 371 (c)(1),
(2), (4) Date: Nov. 15, 2012

(87) PCT Pub. No.: WO2011/147925
PCT Pub. Date: Dec. 1, 2011

(65) Prior Publication Data
US 2013/0058567 A1    Mar. 7, 2013

(30) Foreign Application Priority Data

May 28, 2010   (EP) ...................................... 10305565

(51) Int. Cl.
*G06K 9/00* (2006.01)
*G06K 9/46* (2006.01)
*G06K 9/52* (2006.01)

(52) U.S. Cl.
CPC ............. *G06K 9/4619* (2013.01); *G06K 9/527* (2013.01)
USPC ......................................... 382/159; 382/260

(58) Field of Classification Search
None
See application file for complete search history.

(56) References Cited

U.S. PATENT DOCUMENTS

| | | | | |
|---|---|---|---|---|
| 5,526,299 | A | * | 6/1996 | Coifman et al. ............... 708/801 |
| 7,171,269 | B1 | * | 1/2007 | Addison et al. ................... 607/7 |
| 2006/0251291 | A1 | * | 11/2006 | Rhoads ........................ 382/100 |

OTHER PUBLICATIONS

Bharath A A et al.: "A Steerable Complex Wavelet Construction and Its Application to Image Denoising", IEEE Transactions on Image Processing, IEEE Service Center, Piscataway, NJ, US LNKD-DOI:10.1109/TIP. 2005. 849295, vol. 14, No. 7, Jul. 1, 2005, pp. 948-959, XP011133597, ISSN: 1057-7149 cited in the application abstract, I. Introduction; p. 948, right-hand column—p. 949, left-hand col. II. Pyramid Design; p. 949, left-hand column—p. 953, left-hand col. III. Generating Feature Maps; p. 953, left-hand, (Continued)

*Primary Examiner* — Chan Park
*Assistant Examiner* — Mark Roz
(74) *Attorney, Agent, or Firm* — Young & Thompson

(57) ABSTRACT

A digital filter bank having a number $J \geq 1$ of stages is disclosed. For each integer j such that $1 \leq j \leq J$, the j-th stage includes a plurality of filtering units (20, 21) each receiving an input signal of the j-th stage. These filtering units include a low-pass filtering unit (20) using real filtering coefficients and at least one band-pass filtering unit (21) using complex filtering coefficients. Following each band-pass filtering unit of the j-th stage, a respective modulus processing unit (25) generates a processed real signal as a function of squared moduli of complex output values of the band-pass filtering unit. The input signal of the first stage is a digital signal supplied to the digital filter bank, while for $1 < j \leq J$, the input signal of the j-th stage includes the processed real signal generated by at least one modulus processing unit of the (j−1)-th stage.

16 Claims, 5 Drawing Sheets

(56) References Cited

OTHER PUBLICATIONS

Portilla J et al.: "A Parametric Texture Model Based on Joint Statistics of Complex Wavelet Coefficients", International Journal of Computer Vision, Kluwer Academic Publishers, BO LNKD-DOI: 10.1023/A:1026553619983, vol. 40. No. 1, Oct. 1, 2000. pp. 49-71, XP002473477, ISSN: 1573-1405, cited in the application abstract, 2.1. Local Linear Basis; p. 54-56 3.1. Sequential Projection. Convergence and Efficiency; p. 60, figure 1, figure 10, Cited in ISR.

Schneiderman H et al.: "A statistical method for 3D object detection applied to faces and cars", Proceedings IEEE Computer Society Conference on Computer Visionand Pattern Recognition, XX, XX, vol. 1, Sep. 1, 2000, pp. 746-751, XP002313459, 3, Functional Form of Decision Rule; p. 746-749, figure 3, figure 4, Cited in ISR.

Acharyya M et al.: "An adaptive approach to unsupervised texture segmentation using M-Band wavelet transform". Signal Processing. Elsevier Science Publishers B.V. Amsterdam. NL LNKDDOI: 10.1016/0165-1684(00)00278-4, vol. 81. No. 7, Jul. 1, 2001, pp. 1337-1356, XP004298807, ISSN: 0165-1684, the whole document, Cited in ISR.

Yuhao Gu et al.: "A Fast Medical Image Registration Based on Steerable Pyramid", Intelligent Information Hiding and Multimedia Signal Processing, 2009, IIH-MSP '09, Fifth International Conference on, IEEE, Piscataway, NJ, USA, Sep. 12, 2009, pp. 961-964, XP031569357, A A ISBN: 978-1-4244-4717-6, abstract 1, Introduction First paragraph; p. 961 2. Steerable pyramid; p. 961-963 4. Fast registration algorithm; p. 963 Reference [7]; p. 964, Cited in ISR.

"5.5.3 Ondelettes orientees pour la vision" in: Stephane Mallat: "Une Exploration Des Signaux En Ondelettes", Nov. 1, 2000, Les Editions De L'Ecole Polytechnique, Paris, France, XP002605573, ISBN: 2-7302-0733-3 pp. 153-157, Ondelettes de Gabor; p. 155, Cited in ISR.

Fu-Jie Huang et al., "Large-Scale Learning with SVM and Convolutional Nets for Generic Object Categorization", The Courant Institute of Mathematical Sciences New York University, New York, NY, USA, pp. 1-8, Cited in Specification.

Stephane Mallat, "A Wavelet Tour of Signal Processing", 2nd Edition, Academic Press, 1998-99, London, pp. 156-160.

International Search Report, dated Jul. 27, 2011, from corresponding PCT application.

Bharath et al "A steerable Complex Wavelet Construction and Its Application to Image Denoising", IEEE Transactions on Image Processing, IEEE Service Center, Piscataway, NJ, US LNKD-DOI:10. 1109/TIP.205.849294, vol. 14, No. 7 Jul. 1, 2005, pp. 948-959, XP011133597, ISSN:1057-7149.

* cited by examiner

MULTISCALE MODULUS FILTER BANK AND APPLICATIONS TO PATTERN DETECTION, CLUSTERING, CLASSIFICATION AND REGISTRATION

BACKGROUND OF THE INVENTION

The present invention relates to digital signal processing. It provides a representation of digital signals which can be used in a variety of applications including pattern detection, clustering, classification and registration.

For one dimensional or multidimensional signals, pattern detection, clustering, classification and registration problems require computing a reliable distance that measures the similarity of signals despite the existence of deformations.

For example, if two signals are translated, their Euclidean distance may become very large despite the fact that they are identical up to this translation. In images, such deformations include non-rigid translations, rotations, scaling (zoom in and out). For sounds, it includes frequency transpositions and scaling.

In pattern detection applications, the potential location of a family of predefined patterns in a given signal, where they may appear with deformations, is looked for. Detecting a human face in an image, despite its variability due to different morphologies, pose and/or scaling, is an example of pattern detection problem which requires using a distance that is not sensitive to such deformations.

A clustering problem in a signal involves segmentation to group signal patches that are similar relatively to some distance. Texture segmentation is an example of clustering problem which consists in dividing images into homogeneous texture regions. A clustering problem may also apply to several signals which need to be grouped in homogeneous classes.

A signal classification problem consists in finding the class to which a signal belongs. Classifying signals such as sounds, images, video signals or medical signals requires some measurement of their similarity. Signals that belong to the same class may differ by some important deformation. Such deformations should not alter their similarity distance to classify them appropriately.

Pattern registration is about recovering a deformation that maps a signal onto another signal. In stereo images, this deformation, also called disparity, carries depth information on the scene. In videos, such deformation provides the optical flow. In medical imaging, recovering this deformation allows registration of medical data to analyze potential anomalies.

Standard distances such as the Euclidean distance do not measure the similarity of signals when these signals have undergone some deformation, such as a translation. Indeed, the Euclidean distance between a signal and its translated version is often very large. Instead of measuring a Euclidean distance between signals, one may apply such a distance to some signal representation that is constructed to preserve important signal information while being insensitive to other signal properties. A major difficulty of signal detection, clustering, classification and registration then becomes to compute an appropriate signal representation over which state of the art detection, clustering, classification and registration algorithms may be applied using state of the art distances such as Euclidean distances.

Spectrograms are widely used in the field of speech recognition. They include removing the complex phase of the Fourier transform of an input audio signal restricted by a time window function. Indeed, the complex phase of a Fourier transform can be interpreted as a translation parameter which is removed by the complex modulus operation. However, spectrograms are local Fourier transforms and are thus sensitive to translations that are large relatively to the window size and to other deformations such as a signal scaling.

Multiscale transformations, such as wavelet transforms, have also been used for pattern recognition. In particular, a so-called scalogram, obtained with a complex wavelet transform followed by a modulus computation is a representation which is used for pattern recognition in U.S. Pat. No. 7,171,269. However, at fine scales wavelet coefficients are sensitive to translations and at coarse scales they do not carry enough information to discriminate signals.

In "A Steerable Complex Wavelet Construction and Its Applications to Image Denoising", IEEE Transactions on Image Processing, Vol. 14, No. 7, July 2005, pp. 948-959, A. A. Bharath, et al. disclose a pyramid structure for a filter bank used for sub-band decomposition. The basic pyramidal unit has an isotropic lowpass filter followed by a downsampler, and complex bandpass filters. The structure extends over successive sub-band decomposition stages, the subsampled lowpass component being passed to the following stages. A similar kind of pyramid structure is presented in Portilla, et al., "A Parametric Texture Model Based on Joint Statistics of Complex Wavelet Coefficient", International Journal of Computer Vision, Vol. 40, No. 1, October 2000, pp. 49-71.

Neural networks are also used in the context of pattern recognition. Multilayer neural networks define a cascade of linear and non-linear transformations that can construct efficient signal representations for pattern recognition. In particular, the convolution networks disclosed in "Large-Scale Learning with SVM and Convolutional Nets for Generic Object Categorization" (Fu-Jie Huang and Yann LeCun, Proceedings of the 2006 IEEE Computer Society Conference on Computer Vision and Pattern Recognition, Vol. 1, p. 284-291) perform a cascade of convolutions with real filters followed by some linear operations that typically include an absolute value and a sigmoid transformation. However, these neural networks require a heavy training phase to adjust the filters to the type of patterns encountered in the recognition task.

Accordingly, there is a need to find a generic signal representation that builds strong invariants to various deformations. It is desirable to implement such signal representation using standard band-pass filters which do not depend upon the specific pattern properties, and to avoid a learning stage.

SUMMARY OF THE INVENTION

A digital filter bank having J stages is proposed, where J is an integer greater than one. For each integer j such that $1 \leq j \leq J$, the j-th stage comprises:

a plurality of filtering units each receiving an input signal of the j-th stage, including a low-pass filtering unit and at least one band-pass filtering unit using complex filtering coefficients; and following each band-pass filtering unit of the j-th stage, a respective modulus processing unit for generating a processed real signal as a function of squared moduli of complex output values of said band-pass filtering unit.

The input signal of the first stage is a digital signal supplied to the digital filter bank, while for $1 < j \leq J$, the input signal of the j-th stage includes the processed real signal generated by at least one modulus processing unit of the (j−1)-th stage.

The filter bank converts the input digital signal into a multiscale invariant spectrum which can be made progressively more invariant to any specified group of deformations, for example translations, rotations, scaling, symmetries . . . . From this representation, a reliable similarity distance between signals can be computed by applying a standard distance such as a Euclidean distance. As opposed to state of the art multiscale algorithms, the multiscale invariant spectrum keeps the relevant signal information at all frequencies.

In addition to pattern detection, clustering and classification, building a representation that is progressively invariant to deformations also provides an efficient representation for coarse-to-fine recovery of deformations for signal registration.

The filter bank implements a filtering cascade with low-pass and complex band-pass filters. As opposed to state of the art filter bank algorithms (e.g. U.S. Pat. No. 5,526,299), convolutions are not computed on the output of a previous filter, but on the complex modulus of the previous filter output. As opposed to spectrograms or scalograms, the complex modulus is not applied once, at the output of the linear transform but in each stage of the filter bank, which builds stronger invariants. As opposed to convolution neural networks, the present filter bank uses low-pass and band-pass filters that do not need to be optimized according to a specific pattern recognition problem. It is implemented with a complex modulus operation which removes the complex phase of signals at each stage. Furthermore, the modulus filter bank can be designed to build multiscale invariants to rotation, scaling or any other type of group of deformation, by performing the convolution along rotation, scaling or other type of group parameters.

In an embodiment, the input signal of the j-th stage for $1<j\leq J$ includes the processed real signal generated by each modulus processing unit of the (j−1)-th stage.

Advantageously, the low-pass filtering unit of the j-th stage ($1\leq j\leq J$) is arranged to compute a convolution of the input signal of the j-th stage with real filtering coefficients. Implementation is then simpler than with complex low-pass filtering coefficients, and the Fourier behavior of the low-pass component is improved.

For instance, the low-pass filtering unit in one or more stages comprises a Gaussian filter, and each band-pass filtering unit in the same stage comprises a respective Gabor filter.

In an embodiment, each of the filtering units in at least one of the stages includes a convolver for computing a convolution of the input signal of that stage with filtering coefficients of that filtering unit, output values of the filtering unit being produced as a sub-sampled signal from the computed convolution. Sub-sampling advantageously reduces the size of the multiscale invariant spectrum. Still, it can be dispensed with in certain embodiments or in some of the J stages of the filter bank. All the convolutions can be implemented with fast algorithms.

In at least one of the stages, each modulus processing unit following a respective band-pass filtering unit using complex filtering coefficients may include: a complex-to-real transformer receiving the complex output values of the respective band-pass filtering unit and producing respective real values depending on the squared moduli of said complex output values; and a post-filter for low-pass filtering said real values and outputting the processed real signal for said modulus processing unit. The optional post-filter filters out high frequency signal components introduced by the modulus operation.

In an embodiment, the input signal of the j-th stage for each integer j such that $1\leq j\leq J$ is defined over j variable indexes $k_0, \ldots, k_{j-1}$ in which $k_0$ is an index having d integer components, with $d\geq 1$ being the dimension of the digital signal supplied to the digital filter bank. For $1\leq l<J$, $k_l$ is an integer index associated with the plurality of filtering units of the l-th stage.

It is possible, in certain embodiments, that the filtering units of at least one of the stages include at least one further band-pass filtering unit using real high-pass filtering coefficients, followed by a processing unit for generating a processed real signal as a function of absolute values of real output values of said further band-pass filtering unit. In such an embodiment, this processing unit may include a post-filter for low-pass filtering the absolute values of the real output values.

Typically, the input signal of the j-th stage for each integer j such that $1\leq j\leq J$ is defined over j variable indexes $k_0, \ldots, k_{j-1}$, where $k_0$ is an index having d integer components, with $d\geq 1$ being the dimension of the digital signal supplied to the digital filter bank, and for $1\leq l<j$, $k_l$ is an integer index associated with the plurality of filtering units of the l-th stage.

In the j-th stage (for $j>1$), each value of the integer index $k_{j-1}$ has a one-to-one correspondence with a respective filtering unit of the (j−1)-th stage. In a j-th stage (for $j>2$), the integer index $k_l$ with $1\leq l\leq j-2$ may have a lower resolution with respect to the plurality of filtering units of the l-th stage if the filtering units of one or more stages between the l-th stage and the j-th stage perform filtering and sub-sampling along the variable index $k_l$.

In a convenient implementation of the filter bank, each of the filtering units of a j-th stage ($1\leq j\leq J$) is arranged to compute a convolution of the input signal of the j-th stage with respective filtering coefficients along a single variable index $k_l$, with $0\leq l<j$.

The low-pass filtering unit of a j-th stage may use real filtering coefficients $h_0^j(m)$, and each band-pass filtering unit of the j-th stage may use filtering coefficients $h_{k_j}^j(m)$ such that $h_{k_j}^j(m)=h^j(m)\cdot\exp(i\xi_{k_j}^j\cdot m)$ for a frequency offset value $\xi_{k_j}^j$, m being an index having a number d' of integer components where d' is a dimension of filtering of the input signal of the j-th stage, and $h^j(m)$ designating coefficients of a low-pass filter. For example, the low-pass filtering unit implements a Gaussian filter, and we can design the band-pass filtering units of the same stage as Gabor filters obtained from another Gaussian filter with respective frequency offsets.

An embodiment of the digital filter bank provides, for an integer l such that $1\leq l<J$, that the filtering units of the l-th stage compute convolutions of the input signal of the l-th stage with respective filtering coefficients along the variable index $k_0$. Among those filtering units of the l-th stage, a first band-pass filtering unit uses complex filtering coefficients $h_1^l(k_0)$ while at least one second band-pass filtering unit designated by a respective integer index k, uses respective complex filtering coefficients $h_k^l(k_0)=G_k[h_1^l(k_0)]$, where $G_k$ is an operator acting on d-dimensional discrete signals and belonging to a set of operators having a group structure. The mapping of the group structure can be such that $G_k \cdot G_{k'}=G_{k+k'}$ for any given pair k, k' of integer indexes. In one or more following stages (j-th stage, with $j>l$), the band-pass filtering units can then compute respective convolutions of the input signal of such stage with respective filtering coefficients along the variable index $k_l$. This is one way of designing filter banks to generate multiscale invariant spectra having strong invariance properties with respect to a family of deformations defined by the group $G=\{G_k\}_k$. Such group may cover translations, rotations, dilations, symmetries etc., and their combinations.

Efficient similarity distances for pattern recognition are obtained by applying standard distances (e.g. Euclidean distances) to the multiscale invariant spectrum obtained with the filter bank proposed here. Therefore, pattern detection, clustering, classification or registration of one-dimensional and multidimensional signals can be carried out by applying state of the art detection, clustering, classification or registration processes to the multiscale invariant spectrum proposed here. Other aspects of the invention relate to digital signal processing methods making use of the filter bank.

A pattern detection method according to the invention comprises:
- transforming a digital signal into a spectrum using a digital filter bank as defined above; and
- applying a pattern matching process to at least part of said spectrum and to at least one pre-stored spectrum associated with a respective pattern in order to detect said pattern in the digital signal.

A clustering method according to the invention comprises:
- transforming a digital signal into a spectrum using a digital filter bank as defined above; and
- applying a clustering process to at least part of said spectrum to identify a plurality of clusters and associate each of a plurality of patches of said spectrum with a respective one of the clusters, wherein the patches correspond to different regions of the spectrum or to at least part of different component spectra if the digital signal is made of a plurality of component signals transformed into respective component spectra using the digital filter bank.

A pattern classification method according to the invention comprises:
- transforming a digital signal into a spectrum using a digital filter bank as defined above; and
- applying a pattern classification process to at least part of said spectrum and to pre-stored training parameters corresponding to a plurality of pattern classes in order to associate the digital signal with one of said pattern classes.

A pattern registration method according to the invention comprises:
- transforming a first digital signal into a first spectrum and a second digital signal into a second spectrum using digital filter banks as defined above; and
- applying a pattern registration process to at least part of said first and second spectra in order to identify displacements mapping the first signal onto the second signal.

Other features and advantages of the devices and methods disclosed herein will become apparent from the following description of non-limiting embodiments, with reference to the appended drawings.

BRIEF DESCRIPTION THE DRAWINGS

DESCRIPTION OF EMBODIMENTS

Figure 1:
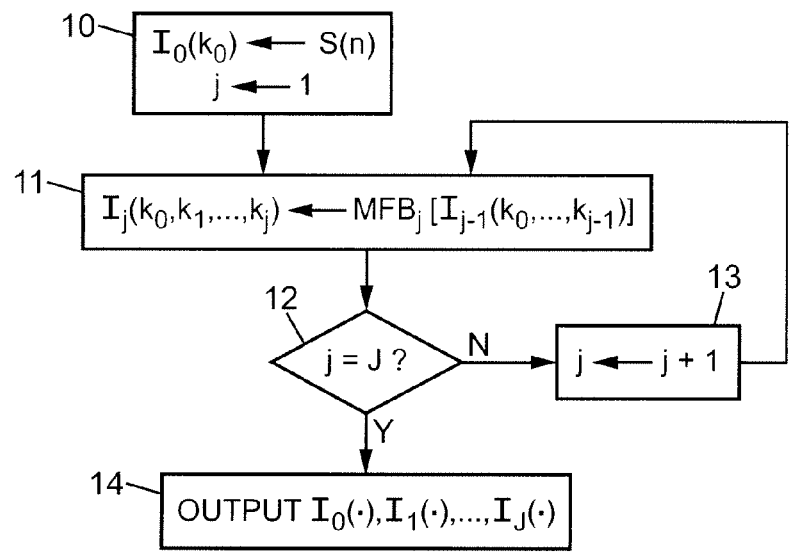
FIG. 1 is a flow chart illustrating the operation of an embodiment of a digital filter bank in accordance with the invention.

FIG. 1 shows steps of a process of filtering digital signals using a filtering structure referred to as a multiscale modulus filter bank (MMFB). The input of the filter bank is d-dimensional digital signal $S(n)=S(n_1, \ldots, n_d)$, where d is a positive integer ($d \geq 1$). This digital signal is available as a d-dimensional array of sample values.

In the following, for convenience and conciseness of the explanation, the terms "spatial variable" are used to designate the input signal variable n, although that variable n may correspond to time or any other signal parameter, as the reader will appreciate. Electrocardiograms (ECGs) or audio recordings are examples of one-dimensional signals ($d=1$) indexed by time. Still images are examples of two-dimensional signals ($d=2$), and video image sequences are examples of three-dimensional signals ($d=3$).

The process involves iterative filtering of signals, starting with the signal S(n) supplied to the filter bank. The process is initialized in step 10 by storing the signal samples in an array $I_0(k_0)=S(k_0)$ to form the input signal for the first stage of the MMFB, where $k_0=n=(n_1, \ldots, n_d)$ is the d-dimensional spatial index defined on the sampling grid of the input signal S. In step 10, the iteration counter j (or stage counter) is also set to 1.

In each iteration j, the input signal of the j-th stage, noted $I_{j-1}(k_0, \ldots, k_{j-1})$, is filtered in step 11 by a so-called modulus filter bank (MFB) having a number $K_j$ of digital filtering units operating in parallel, where $K_j$ is a number greater than one which may vary from one stage to another. The output of the MFB in the j-th iteration is noted $I_j(k_0, \ldots, k_{j-1}, k_j)$ where $k_j$ is an integer variable index in the range of 0 to $K_j-1$. For each value of the index $k_j$, the signal $I_j(k_0, \ldots, k_{j-1}, k_j)$ as a function of the other variable indexes $k_0, \ldots, k_{j-1}$ is the output signal of a respective one of the filtering units of the j-th stage. The set of those signals for $j=0, 1, \ldots, K_j-1$ referred to as an invariant spectrum at scale j.

After the MFB filtering 11, the process checks in step 12 if the number of iterations j has reached the maximum number noted J set by the user or the designer of the MMFB, with $J \geq 2$. If $j<J$, the counter j is incremented by 1 in step 13 and the next iteration of the filtering step 11 is performed, with an input signal equal to the output of the previous stage of the MMFB. When $j=J$ in step 12, the iterations stop and the multiscale invariant spectrum consisting of the signals $I_0(k_0)$, $I_1(k_0, k_1), \ldots, I_J(k_0, k_1, \ldots, k_J)$ can be output in step 14.

The multiscale invariant spectrum is thus made of the concatenation of the invariant spectra at the different scales $j=0, 1, \ldots, J$. It will be appreciated, though, that depending on the application, it may be enough to use only part of the multiscale invariant spectrum, e.g. some of the scales j only, as the output of the MMFB.

Figure 2:
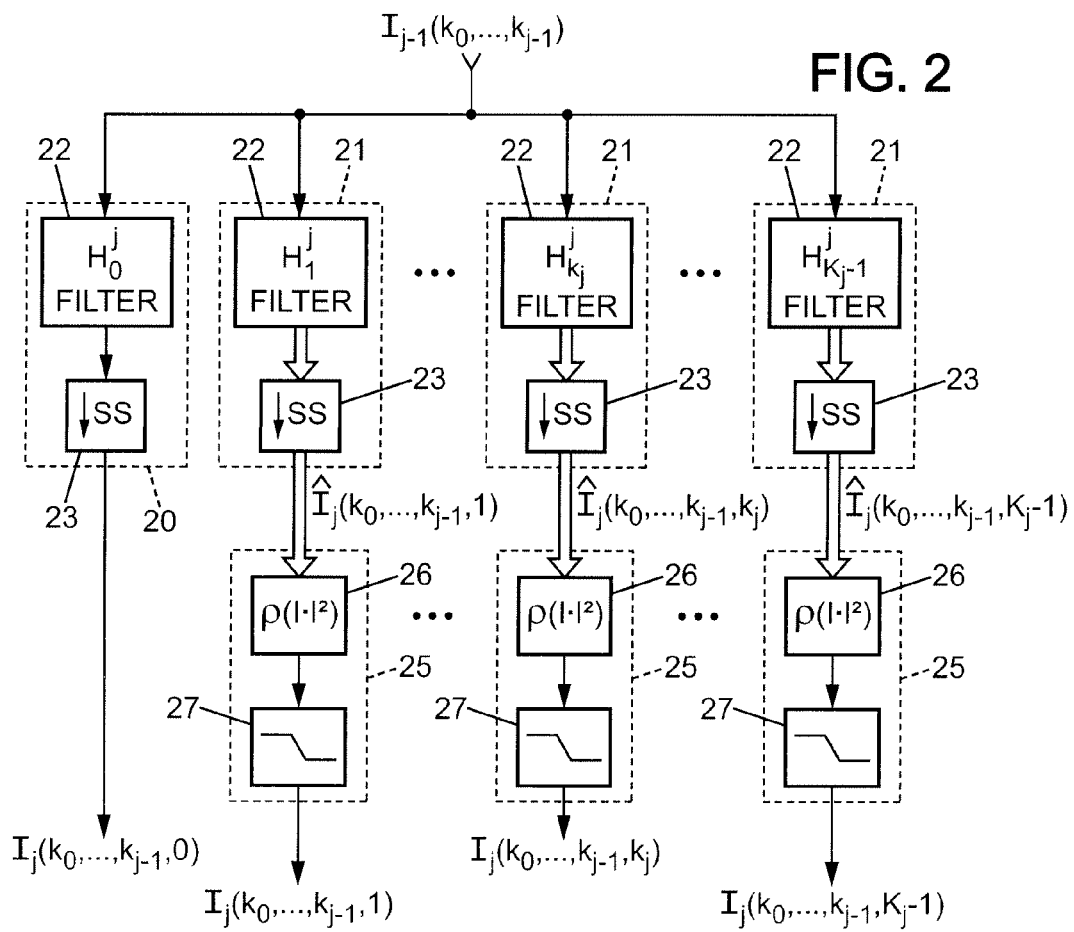
FIG. 2 is a block diagram of a stage of such digital filter bank.

FIG. 2 indicates a general layout of the j-th filtering stage of the MMFB ($1 \leq j \leq J$). The $K_j$ filtering units include a low-pass filtering unit 20 and $K_j-1$ band-pass filtering units 21. The low-pass filtering unit 20 preferably uses real filtering coefficients. In this case, it outputs a real signal (indicated by a thin arrow in FIG. 2) as a low-pass signal $I_j(k_0, \ldots, k_{j-1}, 0)$ included in the invariant spectrum for the j-th scale, i.e. for the variable index $k_j=0$. Each band-pass filtering unit 21 uses complex filtering coefficients and outputs a complex signal (indicated by a thick arrow in FIG. 2).

Each filtering unit 20, 21 of the j-th stage includes a convolver 22 filtering digitally the input signal $I_{j-1}(k_0, \ldots, k_{j-1})$ with an array of filtering coefficients which are real numbers $H_0^j$ in the case of the low-pass filtering unit 20 and complex numbers $H_{k_j}^j$ ($k_j \geq 1$) in the case of the band-pass filtering unit(s) 21. Optionally, the output of each convolver 22 of the stage is sub-sampled, which is illustrated in FIG. 2 by a downsampling unit 23 downstream of the convolver 22. In practice, when sub-sampling is used, the convolver 22 may output directly the signal at the desired sampling rate. For example, when the sub-sampling factor is 2, the sampling rate at the output of the convolver 22 may be half that at the input.

The complex signals $\hat{I}_j(k_0, \ldots, k_{j-1}, k_j)$ output by the band-pass filtering units 21 ($k_j \geq 1$) are transformed into real signals by respective modulus processing units 25. Each modulus processing unit 25 includes a complex-to-real transformer 26 which receives the output values of the respective filtering unit 21. For each received complex value $\hat{I}_j(k_0, \ldots, k_{j-1}, k_j) = z = z_1 + i \cdot z_2$ (where $i^2 = -1$), the complex-to-real transformer 26 computes a real value r depending on the squared modulus $|z|^2 = z_1^2 + z_2^2$ of the received complex value: $r = \rho(|z^2|)$.

A typical choice for the function $\rho$ is the square root, in which case the complex-to-real transformer 26 computes the modulus of z. In a practical implementation, the square root function may be approximated for computation simplicity. It is also possible to combine the square root function with a gain saturation operator such as a sigmoid function, e.g. $\rho(x) = \tan^{-1}(\sqrt{x})$.

Optionally, each modulus processing unit 25 of the j-th stage includes a post-filter 27 downstream of the complex-to-real transformer 26. The post-filter 27 is implemented as a low-pass filter, e.g. a Gaussian filter, to remove high frequency components introduced by the modulus operation in the transformer 26. If the output is further subdecomposed in a (j+1)-th stage, for computational efficiency, the post-filter 27 can also be integrated in the filters $H_{k_{j+1}}^{j+1}$ of the (j+1)-th stage by incorporating the low-pass filtering in these filters.

Each modulus processing unit 25 of the j-th stage outputs a real signal as a respective band-pass signal $I_j(k_0, \ldots, k_{j-1}, k_j)$ of the j-th stage for the variable index $k_j = 1, 2, \ldots, K_j - 1$.

State of the art filtering algorithms can be used for fast implementation in the convolvers 22. In particular, separable multidimensional filters $H_{k_j}^j$ are implemented with separable convolutions.

For $k_j = 0$, the convolution output on the sub-sampled grid is the next spectrum signal $I_j(k_0, \ldots, k_{j-1}, 0)$ which, for example, may be expressed as follows:

$$I_j(k_0, \ldots, k_{j-1}, 0) = I_{j-1} * H_0^j(k_0, \ldots, k_{j-1}) = \qquad (1)$$
$$\sum_{k' = (k'_0, \ldots, k'_{j-1})} I_{j-1}(k'_0, \ldots, k'_{j-1}) \cdot H_0^j(k_0 - k'_0, \ldots, k_{j-1} - k'_{j-1})$$

For $0 < k_j < K_j$, the convolution output $\hat{I}_j(k_0, \ldots, k_{j-1}, k_j)$ on the sub-sampled grid is, for example:

$$\hat{I}_j(k_0, \ldots, k_{j-1}, k_j) = I_{j-1} * H_{k_j}^j(k_0, \ldots, k_{j-1}) = \qquad (2)$$
$$\sum_{k' = (k'_0, \ldots, k'_{j-1})} I_{j-1}(k'_0, \ldots, k'_{j-1}) \cdot H_{k_j}^j(k_0 - k'_0, \ldots, k_{j-1} - k'_{j-1})$$

In a preferred embodiment, the filtering units 20, 21 of a given stage j perform convolutions and sub-sampling along a single variable index $k_l$ with $0 \leq l < j$. In other words, all the filters $H_{k_j}^j$ in the convolvers 22 ($0 \leq k_j < K_j$) filter $I_{j-1}(k_0, \ldots, k_{j-1})$ along the index $k_l$. If $\delta(k)$ designates the Kronecker delta function such that $\delta(k) = 1$ if $k = 0$ and $\delta(k) = 0$ if $k \neq 0$, the separable filters are defined by:

$$H_{k_j}^j(k_0, \ldots, k_{l-1}, k_l, k_{l+1}, \ldots, k_{j-1}) = \delta(k_0) \ldots \delta(k_{l-1}) \cdot h_{k_j}^j(k_l) \cdot \delta(k_{l+1}) \ldots \delta(k_{j-1}) \qquad (3)$$

where the coefficients $h_{k_j}^j(k_l)$ are made of real numbers in the low-pass filtering unit 20 and of complex numbers in the band-pass filtering units 21. If $l = 0$, namely if the signal is being filtered along the spatial index $k_0$, the notation $h_{k_j}(k_l)$ is for a d-dimensional vector of real or complex coefficients. If $l \neq 0$, it stands for one real or complex coefficient.

Filtering in the convolvers 22 is thus implemented only along the variable $k_l$:

$$I_j(k_0, \ldots, k_l, \ldots, k_j) = \qquad (4)$$
$$\sum_{k'} I_{j-1}(k_0, \ldots, k_{l-1}, k', k_{l+1}, \ldots, k_{j-1}) \cdot h_{k_j}^j(k_l - k')$$

and it may be computed over values of $k_l$ that are sub-sampled relatively to the sampling grid of $I_{j-1}$.

The filter $h_0^j$ is a real low-pass filter whereas the filters $h_{k_j}^j$ for $1 \leq k_j < K_j$ are complex band-pass filters. A complex band-pass filter $h_k^j(m)$ can be obtained by multiplying the coefficients of a low-pass filter $h^j(m)$ by a complex exponential $\exp(i \xi_k^j \cdot m)$ of frequency $\xi_k^j = (\xi_{k,1}^j, \ldots, \xi_{k,d'}^j)$ with d' being the dimension of the filtering and $\xi_k^j \cdot m$ designating the inner product $\xi_k^j \cdot m = \xi_{k,1}^j \cdot m_1 + \ldots + \xi_{k,d'}^j \cdot m_{d'}$. When separable filters are used, we have d'=d if the signal is filtered along the spatial index $k_0$ (l=0). The complex exponential shifts the transfer function $\hat{h}^j(\omega)$ of the low-pass filter by a predetermined frequency offset value $\xi_k^j$. The transfer function $\hat{h}_k^j(\omega) = \hat{h}^j(\omega - \xi_k^j)$ of this complex band-pass filter is thus non-negligible only in the neighborhood of the frequency $\xi_k^j$.

In the particular case where the non-zero frequency coordinates $\xi_{k_j,p}^j$ of $\xi_{k_j}^j$ ($1 \leq p \leq d'$) are equal to $\pi$ or $-\pi$, the complex exponential $\exp(i \xi_{k_j}^j \cdot m)$ is degenerated into a real number since the components of m are integers. In this case, the band-pass filtering is indeed a high-pass filtering in view of the sampling frequency of the signal. If $h^j(m)$ is a real low-pass filter, then the convolver 22 carrying out the high-pass filtering with the transfer function $\hat{h}_{k_j}^j(\omega) = \hat{h}^j(\omega - \xi_{k_j}^j)$ belongs to a further band-pass filtering unit using real high-pass filtering coefficients, and the following processing unit 25 generates a processed real signal $I_j(k_0, \ldots, k_{j-1}, k_j)$ as a function of the absolute values of the real output values from the further band-pass filtering unit. The absolute values can be computed in the transformer 26 by dropping the sign bit and they are optionally low-pass filtered in a post-filter 27.

A limit case of the MMFB occurs where any band-pass filtering unit in one or more stages j is a real high-pass filter generated as mentioned above. In other words, the j-th stage has:

- a plurality of filtering units each receiving the input signal of the j-th stage, including a low-pass filtering unit 20 using real filtering coefficients $h_0^j(m)$ and at least one band-pass filtering unit 21 also using real filtering coefficients $h_{k_j}^j(m)$ which can be chosen such that $h_{k_j}^j(m) = h^j(m) \cdot \exp(i \xi_{k_j}^j \cdot m)$ for a frequency offset value $\xi_{k_j}^j$, m being an index having a number d' of integer components where d' is a dimension of filtering of the input signal of the j-th stage, where $h^j(m)$ designates coefficients of a real low-pass filter, wherein each component of the frequency offset value $\xi_{k_j}^j$ is $\pm \pi$; and
- following each band-pass filtering unit of the j-th stage, a respective modulus processing unit 25 for generating a processed real signal as a function of absolute values of complex output values of said band-pass filtering unit, whereby for $1 < j \leq J$, the input signal of the j-th stage includes the processed real signal generated by each modulus processing unit of the (j−1)-th stage.

This limit case may not be optimal in terms of invariance properties, but it has an advantage of having a simpler implementation than with complex band-pass filters.

In an exemplary embodiment, $h_0^j$ is a normalized Gaussian window of variance $\sigma_0^2$:

$$h_0^j(m) = \lambda \cdot \exp\left(-\frac{\sum_{p=1}^{d'} m_p^2}{2\sigma_0^2}\right) \qquad (5)$$

where $\lambda$ is adjusted so that $\|h_0^j\|=1$, and $h^j$ is also a normalized Gaussian window which may be the same as or different from $h_0^j$. The resulting filters $h_{k_j}^j$ are so-called Gabor filters. Typically, $h^j$ has a larger variance $\sigma^2$ than $h_0^j$ ($\sigma^2 \geq \sigma_0^2$).

The low-pass post-filter 27 of a modulus processing unit 25 computes a convolution along the same variable index $k_l$ as the preceding convolver 22, with an impulse response $\tilde{h}(k_l)$, i.e.:

$$I_j(k_0, \ldots, k_{j-1}, k_j) = \qquad (6)$$
$$\sum_{k'} \rho\left(\left|\hat{I}_j(k_0, \ldots, k_{l-1}, k', k_{l+1}, \ldots, k_j)\right|^2\right) \cdot \tilde{h}(k_l - k')$$

The low-pass filter $\tilde{h}(k_l)$ is normalized so that $$\sum_k \tilde{h}(k) = 1.$$

For example, the low-pass filter $\tilde{h}(k_l)$ can be a low-pass Gaussian filter.

Figure 3:
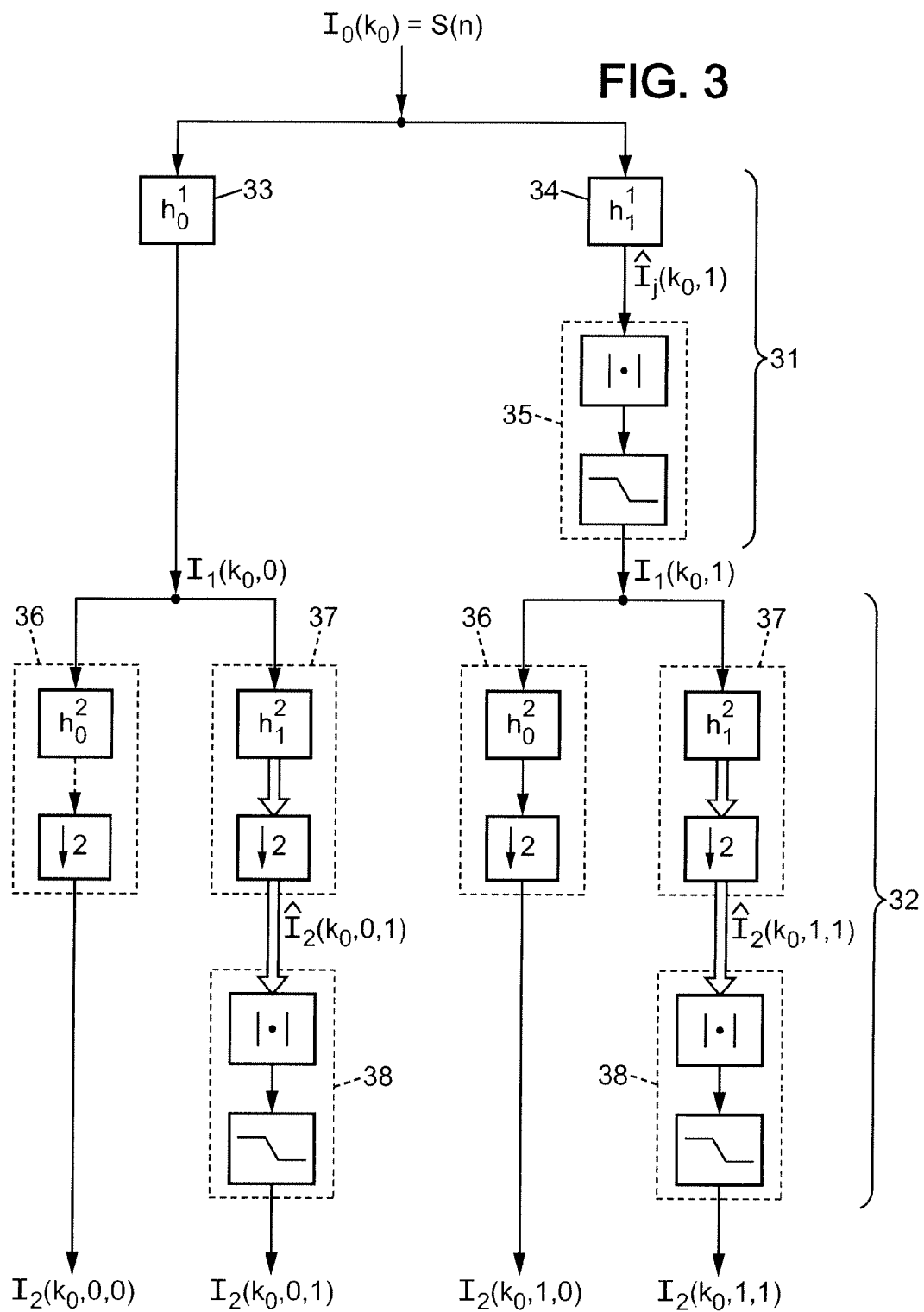
FIGS. 3-5 are schematic diagrams of three examples of filter banks configured in accordance with the invention.
Figure 4:
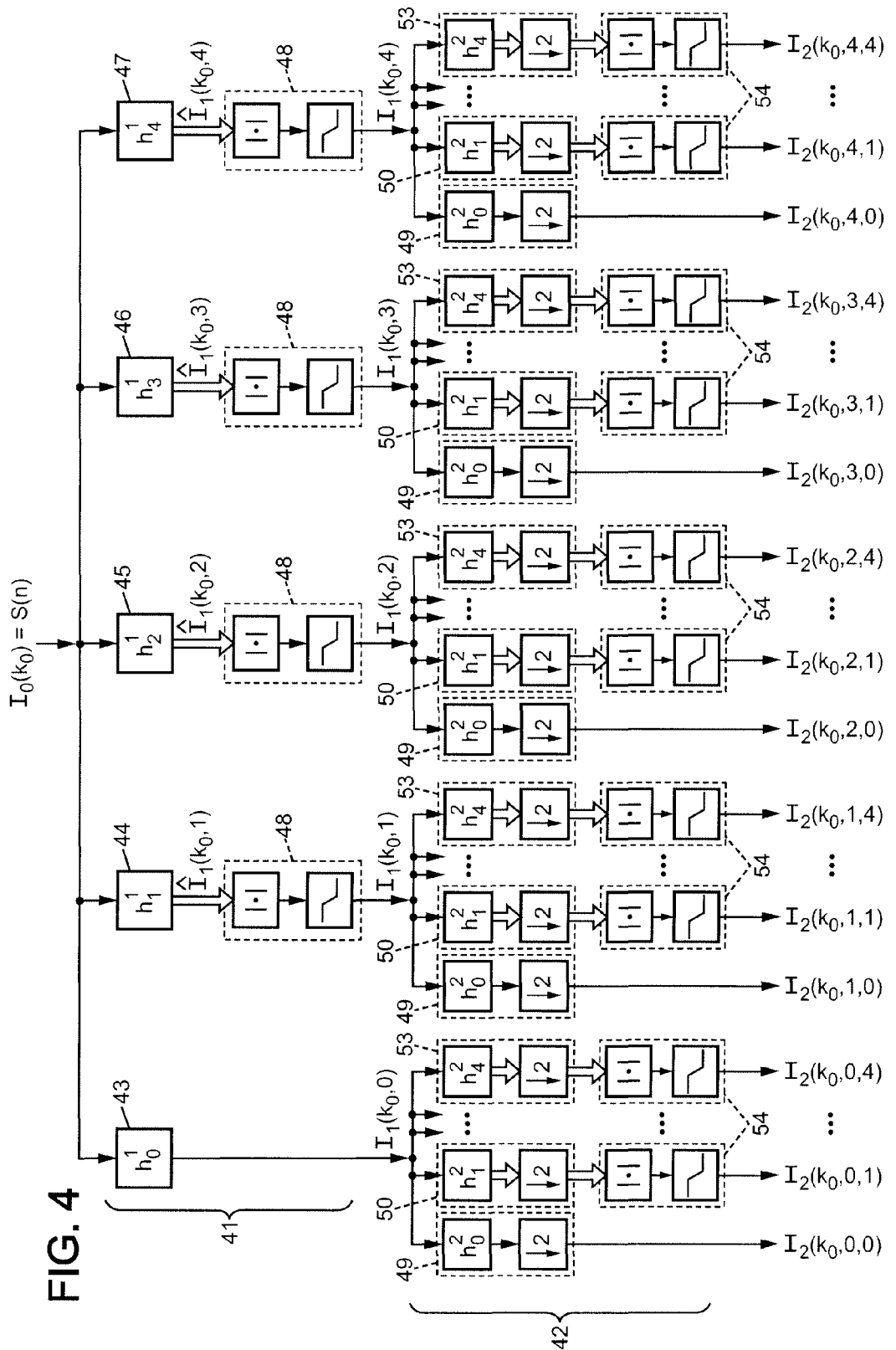

In the exemplary embodiments illustrated in FIGS. 3 and 4, the MMFB computes multiscale invariant spectra relatively to spatial translation only. In this case, for all iterations j, the filtering takes place along $k_0$ (l=0). Hence, the filters $H_{k_j}^j$ filter the input signal $I_{j-1}(k_0, \ldots, k_{j-1})$ only along the spatial variable $k_0$ with a filter $h_{k_j}^j$ which is called a spatial filter.

FIG. 3 illustrates a simple embodiment of a MMFB having J=2 stages, in which the input signal S(n) is of dimension d=1 and $K_j=2$ filters are used in each stage j. The first stage 31 (j=1) transforms the input signal $I_0(k_0)$=S(n) of N samples into two signals $I_1(k_0, 0)$ and $I_1(k_0, 1)$ of size N with a low-pass filter 33 having real coefficients $h_0^1$ and a band-pass filter 34 having complex coefficients $h_1^1$ which convolve $I_0(k_0)$ along the spatial parameter $k_0$, with no sub-sampling. In the example, the modulus processing unit 35 computes the modulus of the complex output of the band-pass filter 34, i.e. using a gain function $\rho(x)=\sqrt{x}$, and it convolves this modulus with a Gaussian post-filter $\tilde{h}(k_0)$ of variance ⅓. A possibility for the first stage 31 is to use a Gaussian low-pass filter 33 with $\sigma=1/\sqrt{3}$ and a Gabor band-pass filter 34 with $\sigma=2/\sqrt{3}$ and $\xi_1^1=3\pi/4$.

In the next stage 32 (j=2), a low-pass filtering unit 36 and a band-pass filtering unit 37 both receive the input signal $I_1(k_0, k_1)$. In the representation of FIG. 3, each filtering unit 36, 37 is depicted as a parallel arrangement of two sub-units which receive the respective components $I_1(k_0, 0)$ and $I_1(k_0, 1)$ of the input signal. The two sub-units 36 use real coefficients $h_0^2$ and output the real low-pass signals $I_2(k_0, 0, 0)$ and $I_2(k_0, 1, 0)$ of size N/2 if a sub-sampling factor of 2 is used. They may be implemented as Gaussian low-pass filters with $\sigma=1$. The two sub-units 37 use complex coefficients $h_1^2$ and output complex signals $\hat{I}_2(k_0, 0, 1)$ and $\hat{I}_2(k_0, 1, 1)$ of size N/2 if a sub-sampling factor of 2 is used. They may be implemented as Gabor band-pass filters with $\sigma=\sqrt{5}$ and $\xi_1^2=2\pi/5$. The second stage 32 further includes two identical modulus processing units 38 which perform the same operations as the modulus processing unit 35 of the first stage 31 downstream of the band-pass filtering sub-units 37 to output the respective real band-pass signals $I_2(k_0, 0, 1)$ and $I_2(k_0, 1, 1)$.

To compute an invariant spectrum at a larger scale if J>2, i.e. to compute $I_j(k_0, \ldots, k_{j-1}, k_j)$ from $I_{j-1}(k_0, \ldots, k_{j-1})$ with j>2, the above-described binary filter bank tree is continued, with the same filters $h_0^j=h_0^2$ and $h_1^j=h_1^2$ together with sub-sampling by a factor 2 and a modulus processing unit at the output of each complex band-pass filtering unit $h_1^2$. For each integer l such that $0<l\leq j$, the spectrum $I_j(k_0, \ldots, k_{j-1}, k_j)$ is then defined for $k_l=0$ or $k_l=1$ and includes $N/2^{j-1}$ samples along $k_0$.

Another exemplary embodiment suitable for analyzing images (d=2) is shown in FIG. 4. In this example, there are J=2 stages and $K_j=5$ filters per stage. The first stage 41 of the MMFB (j=1) transforms the input signal $I_0(k_0)$=S(n)=S($n_1$, $n_2$) of N pixels into five signals $I_1(k_0, k_1)$ of size N for $0 \leq k_1 \leq 4$, with a low-pass filter 43 having real coefficients $h_0^1$ and four band-pass filters 44-47 having complex coefficients $h_1^1$, $h_2^1$, $h_3^1$, $h_4^1$ which convolve $I_0(k_0)$ along the spatial parameter $k_0$, without sub-sampling. Downstream of each band-pass filter $h_{k_1}^1$ with $k_1>0$, a respective modulus processing unit 48 computes the modulus of the complex output of that band-pass filter, i.e. using a gain function $\rho(x)=\sqrt{x}$, and it convolves this modulus with a post-filter $\tilde{h}(k_0)$ which can be chosen to be a Gaussian of variance ⅓. A possibility for the first stage 41 is to use a two-dimensional Gaussian low-pass filter 43 having coefficients $h_0^1(n)$ with $\sigma=1/\sqrt{3}$ and four Gabor band-pass filters 44-47 defined by $h_k^1(n)=h^1(n)\cdot\exp(i\xi_k\cdot n)$ where $h^1(n)$ is a Gaussian with $\sigma=2/\sqrt{3}$ and $\xi_k=\xi\cdot(\cos\theta_k, \sin\theta_k)$, $\theta_k=k\pi/4$ for $1\leq k \leq 4$, and $\xi=3\pi4$.

In the next stage 42 (j=2), a low-pass filtering unit 49 and $K_2-1=4$ band-pass filtering units 50-53 all receive the input signal $I_1(k_0, k_1)$. In the representation of FIG. 4, each filtering unit 49-53 is depicted as a parallel arrangement of $K_1=5$ sub-units which receive the respective components $I_1(k_0, k_1)$ of the input signal for $k_1=0, 1, 2, 3$ and 4. The five sub-units 49 use real coefficients $h_0^2$ and output the real low-pass signals $I_2(k_0, k_1)$ for $0\leq k_1 \leq 4$, of size N/4 if a sub-sampling factor of 2 is used along each spatial direction. They may be implemented as Gaussian low-pass filters with $\sigma=1$. For each integer $k_1$ such that $1\leq k_1 \leq 4$, five filtering sub-units 50-53 convolve $I_1(k_0, k_1)$ with complex coefficients $h_{k_1}^2$ and output complex signals $\hat{I}_2(k_0, k_1, 1)$, $\hat{I}_2(k_0, k_1, 2)$, $\hat{I}_2(k_0, k_1, 3)$ and $\hat{I}_2(k_0, k_1, 4)$ of size N/4 if a sub-sampling factor of 2 is used along each spatial direction. They may be implemented as Gabor band-pass filters defined by $h_k^2(n)=h^2(n)\cdot\exp(i\xi_k\cdot n)$ with $\xi=\sqrt{5}$, $\xi_k=\xi\cdot(\cos\theta_k, \sin\theta_k)$, $\theta_k=k\pi/4$ for $1\leq k \leq 4$, and $\xi=\pi/2$. the second stage 42 further includes identical modulus processing units 54 which perform the same operations as the modulus processing units 48 of the first stage 41 downstream of the band-pass filtering sub-units 50-53 to output the respective real band-pass signals $I_2(k_0, k_1, k_2)$ for $0\leq k_1 \leq 4$ and $1\leq k_2 \leq 4$.

To compute an invariant spectrum at a larger scale if J>2, i.e. to compute $I_j(k_0, \ldots, k_{j-1}, k_j)$ from $I_{j-1}(k_0, k_{j-1})$ with j>2, the above-described filter bank tree is continued, with the same filters $h_k^j=h_k^2$ for $0\leq k \leq 4$ together with sub-sampling by a factor 2 along each spatial direction and a modulus processing unit at the output of each complex band-pass filtering unit $h_k^2$ for k>0. For each integer l such that $0<l\leq j$, the spectrum $I_j(k_0, \ldots, k_{j-1}, k_j)$ is then defined for $k_j=0, 1, 2, 3$ or $4$ and includes $N/2^{2(j-1)}$ pixels along $k_0$.

Other embodiments of the MMFB compute spectra that are invariant relatively to translation but also relatively to other groups of deformations.

We denote by $G=\{G_k\}_k$ a group of operators which act on discrete signals, with $G_k \cdot G_{k'} \cdot G_{k+k'}$. To compute multiscale invariant spectra relatively to such a group in an exemplary embodiment, at an iteration $j=l$, the spectrum $I_l$ is computed with $K_l-1$ complex band-pass spatial filters $h_k^l(k_0)$ which are synthesized by transforming a single complex band-pass filter $h_1^l(k_0)$ with respective operators $G_k$ of the group G:

$$h_k^l(k_0) = G_k[h_1^l(k_0)] \qquad (7)$$

In dimension $d=2$, an operator $G_k$ of the group may correspond to a rotation by an angle $\theta_k = \pi(k-1)/(K_l-1)$ for $1 \leq k < K_l$. For $n=(n_1, n_2)$, we have $G_k[h_1^l(n)] = h_1^l(R_k[n])$ where $R_k[n_1, n_2] = (n_1 \cos \theta_k - n_2 \sin \theta_k, n_1 \sin \theta_k + n_2 \cos \theta_k)$ is a rotation by an angle $\theta_k$.

For example, if $h_1^l(k_0)$ is a Gabor filter modulated at a frequency $\xi_1 = (\xi, 0)$, then $h_k^l(k_0)$ is a Gabor filter whose center frequency $\xi_k$ is rotated by $-\theta_k$ in the frequency plane: $\xi_k = \xi \cdot (\cos \theta_k, -\sin \theta_k)$.

An operator $G_k$ of the group may also correspond to a dilation by a factor $a^k$ where $a$ is a scaling parameter greater than one and $1 \leq k < K$. In this case, $h_k^l = G_k[h_1^l]$ is dilated by $a^k$: $h_k^l(n) = \lambda_k h_1^l(a^{-k}n)$, where $\lambda_k$ is adjusted so that $\|h_k^l\|=1$.

Invariants may also be computed relatively to multidimensional groups such as the product of rotations and dilations. In the latter case the index of the group operators is $k=(r, s)$ is multidimensional and specifies an operator $G_k$ which is the composition of a rotation by an angle $O_r$ and a scaling by a factor $a^s$. Any other multidimensional group of deformation operators $G_k$ may be used to select filters in the modulus filter bank, to compute a multiscale invariant spectrum relatively to such group.

To compute a multiscale invariant relatively to the group G over q scales, in the next q stages, i.e. for j going from l+1 to l+q, the filtering of $I_{j-1}(k_0, \ldots, k_{j-1})$ is performed along the variable $k_l$ of the last spatial filtering index.

In an embodiment, the output $h_0^j(k_0)$ of the spatial low-pass filter of the l-th stage is not retransformed up to the (l+q)-th stage. For $l<j \leq l+q$, we can then set:

$$I_j(k_0, \ldots, k_{l-1}, 0, \ldots, 0) = I_j(k_0, \ldots, k_{l-1}, 0) \qquad (8)$$

The output of the spatial band-pass filters is retransformed with a convolution along $k_l$ and, optionally, a sub-sampling along $k_l$ prior to the modulus processing:

$$I_j(k_0, \ldots, k_l, k_j) = \qquad (9)$$
$$\sum_{k' \neq 0} I_{j-1}(k_0, \ldots, k_{l-1}, k', k_{l+1}, \ldots, k_{j-1}) \cdot h_{k_j}^j(k_l - k')$$

In an exemplary embodiment, for $l<j \leq l+q$, the filter $h_0^j(k_l)$ is a Gaussian filter and the filters $h_k^j(k_l)$ are Gabor complex band-pass filters for $k>0$.

At the next iteration $j=l+q+1$, a spatial filtering may again be applied with filters derived according to (7) from a filter $h_1^{l+q+1}(k_0)$ operators $G_k$ of a suitable group G' (which may be the same as or different from G). The invariance relatively to the group G' is obtained again with q' filtering and modulus operations performed along the index $l+q+1$ of the last spatial filtering.

Figure 5:
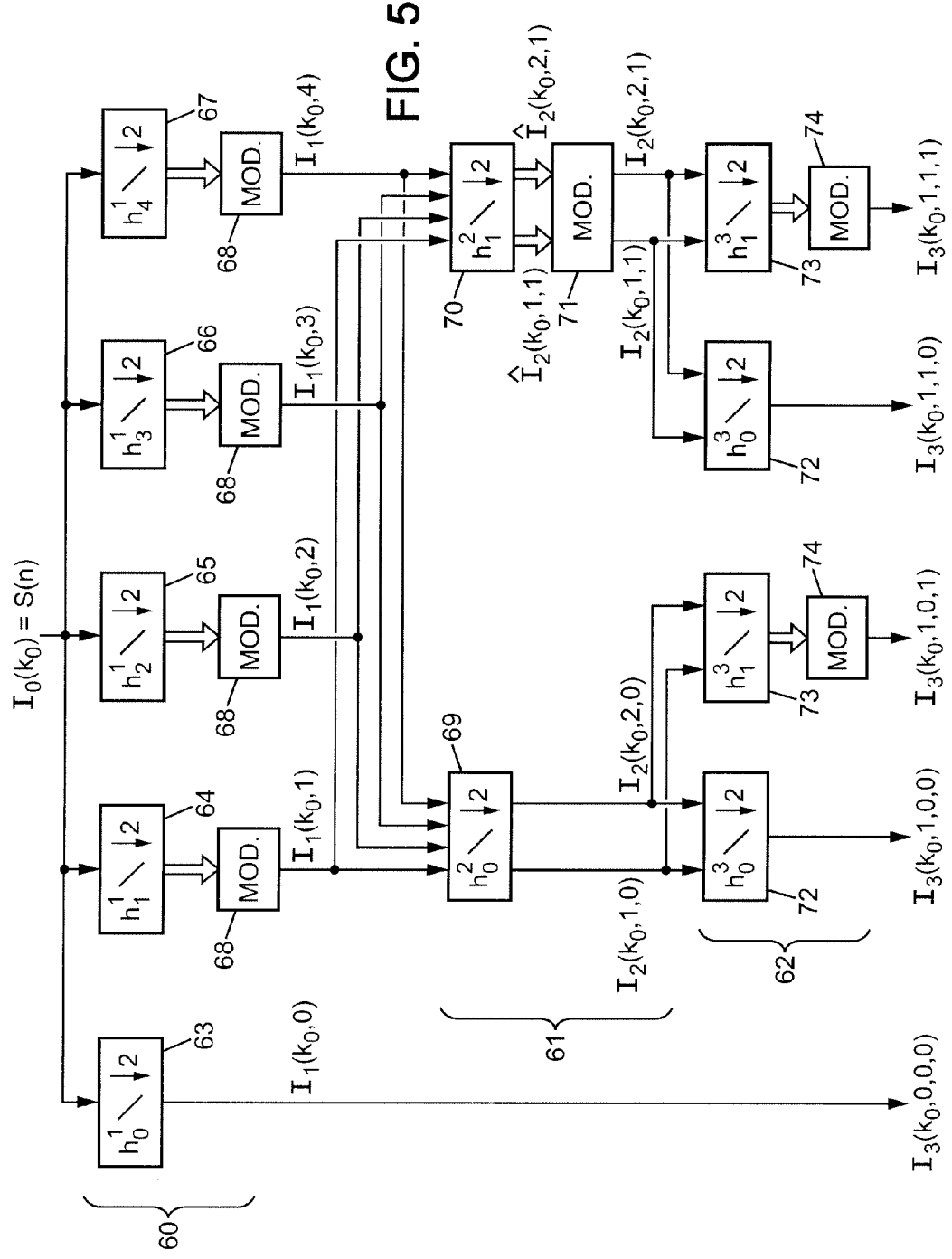

FIG. 5 illustrates an embodiment in which $l=1$ and $q=2$ ($J=l+q=3$). The input signal $I_0(k_0)=S(n)$ of size N in dimension d is decomposed in the first stage 60 ($j=1$) with $K_1=5$ spatial filtering units 63-67 which convolve the input signal $I_0(k_0)$ with respective coefficients $h_{k_1}^1(n)$ for $0 \leq k_1 < 5$. The low-pass filtering unit 63 may be implemented as a Gaussian low-pass filter. It uses real coefficients $h_0^1(n)$ and outputs the real low-pass signal $I_1(k_0, 0)$ which will be kept all the way to the last stage l-q according to (8), namely $I_1(k_0, 0) = I_2(k_0, 0, 0) = I_3(k_0, 0, 0, 0)$.

The coefficients $h_{k_1}^1(n)$ of the complex band-pass filter units 65-67 ($2 \leq k_1 < 5$) may be obtained by rotating or scaling those $h_1^1(n)$ of the complex band-pass filter unit 64 using operators $G_k$ of a group: $h_{k_1}^1(n) = G_{k_1}[h_1^1(n)]$. In the illustrated embodiment, the outputs of the spatial filtering units 63-67 of the first stage are each of size $N/2^d$, i.e. a sub-sampling factor of 2 is used along each spatial direction. The complex band-pass filter unit 64 from which the other filters are derived may comprise a Gabor filter having a bigger variance than the Gaussian filter of the low-pass filtering unit 63. Downstream of each band-pass filter $h_{k_1}^1$ with $k_1>0$, a respective modulus processing unit 68 computes the squared modulus of the complex output of that band-pass filter, applies a gain function $\rho(x)$, and optionally convolves the result with a post-filter, to obtain the real band-pass signals $I_1(k_0, k_1)$ for $1 \leq k_1 < 5$.

These spectrum signals $I_1(k_0, k_1)$ are retransformed by the filtering units of the second stage 61 ($j=2$), where $K_2=2$ in the example shown in FIG. 5. They include a low-pass filtering unit 69 using real coefficients $h_0^2(n)$ and a band-pass filtering unit 70 using complex coefficients $h_1^2(n)$. Both units 69, 70 perform a convolution and a sub-sampling by 2 along the index $k_1$ of the previous spatial filtering. The low-pass unit 69 yields the sub-sampled real low-pass signal $I_2(k_0, k_1, 0)$ and the band-pass unit 70 yields the sub-sampled complex band-pass signal $\hat{I}_2(k_0, k_1, 1)$, the range for $k_1$ being $\{1, 2\}$, i.e. reduced from the original range $\{1, 2, 3, 4\}$ by the sub-sampling factor of 2. The complex band-pass filtering unit 70 is followed by a modulus processing unit 71 which yields the two components of the real band-pass signal $I_2(k_0, k_1, 1)$.

The output signals $I_2(k_0, k_1, k_2)$ of the second stage 61 still have $N/2^d$ samples along $k_0$ because the convolution and sub-sampling are performed along the variable index $k_1$. In this illustration, the convolution is over 4 samples corresponding to $k_1=1, 2, 3, 4$, and the sub-sampling yields values only for $k_1=1, 2$.

In the third stage 62 ($j=2$), a low-pass filtering unit 72 and a band-pass filtering unit 73 both receive the input signal $I_2(k_0, k_1, k_2)$. In the representation of FIG. 5, each filtering unit 72-73 is depicted as a parallel arrangement of two sub-units which receive the respective components $I_2(k_0, k_1, k_2)$ of the input signal for $k_2=1$ and 2. The two sub-units 72 use real coefficients $h_0^3(n)$ and output the real low-pass signals $I_3(k_0, k_1, k_2, 0)$ with a further sub-sampling factor of 2 along the variable index $k_1$. The two sub-units 73 convolve $I_2(k_0, k_1, k_2)$ with complex coefficients $h_1^3(n)$ and output complex signals $\hat{I}_3(k_0, k_1, k_2, 1)$ with the further sub-sampling factor of 2 along the variable index $k_1$. The third stage 62 further includes two identical modulus processing units 74 which perform the same operations as the modulus processing unit 71 of the previous stage 61 downstream of the band-pass filtering sub-units 73 to output the real band-pass signal $I_3(k_0, k_1, k_2, 1)$ A multiscale spectrum may be computed for $j>3$ by first performing again a spatial transformation, for example with the same $K_1-1$ spatial band-pass filters as in the first stage, and then performing two more iterations of modulus filtering along the index of the last spatial filtering.

An MMFB as exemplified in FIGS. 1-5 can be implemented using dedicated hardware logic or programmable hardware logic such as field-programmable gate arrays (FPGA). In addition, it lends itself to software implementations using computer programs written in any suitable language for running on general-purpose computers, digital signal processors (DSP) or application-specific integrated circuits (ASIC).

The MMFB has a wide range of applications, of which some are discussed more particularly below.

Figure 6:
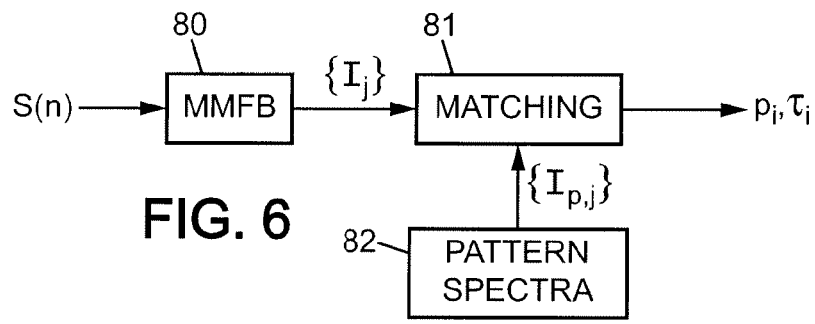
FIGS. 6-9 are block diagrams of digital signal processing apparatuses making use of the present filter bank applied to pattern detection, clustering, classification and registration, respectively.

FIG. 6 shows an exemplary configuration of a pattern detection apparatus which processes a d-dimensional input signal S(n). The pattern detection apparatus detects the location of a potential family of patterns in S(n) and outputs a pattern location array which specifies the position of each type of pattern in S(n). Face detection in images is an example of pattern detection.

The input signal S(n) is processed by the multiscale modulus filter bank unit 80, which determines a multiscale invariant spectrum $\{I_j\}_{1 \le j \le J}$ as described above. The matching unit 81 takes in input at least one scale of this multiscale invariant spectrum and detects the location of a family of P potential patterns in the signal S(n). Any state of the art pattern detection algorithm may be used in unit 81.

In an exemplary embodiment, each of the P patterns is represented by a normalized signal $S_p$ for $1 \le p \le P$. The pattern detection is performed at the coarsest scale, i.e. based on the invariant spectrum $I_J$ at the index $j=J$. For each p, the invariant spectrum $I_{p,J}$ of $S_p$ is pre-computed at the coarsest scale index J with the MMFB and stored in a memory 82.

The pattern detection is implemented by unit 81 with a match filtering procedure which finds the potential locations of different invariant spectra $\{I_{p,J}(k_0, k_1, \ldots, k_J)\}_p$ in the signal invariant spectrum $I_J(k_0, k_1, \ldots, k_J)$ of the input signal S(n). We denote by $T_\tau I_J = I_J(k_0 - \tau, k_1, \ldots, k_J)$ the translation of $I_J$ along the spatial variable $k_0$ by the vector $\tau$. The Euclidean norm on the spectrum modulus is written:

$$\|T_\tau I_J - I_{p,J}\|^2 = \sum_{k_0, k_1, \ldots, k_J} (I_J(k_0 - \tau, k_1, \ldots, k_J) - I_{p,J}(k_0, k_1, \ldots, k_J))^2 \quad (10)$$

The sum is performed over all spatial indexes $k_0$ on the support of $I_{p,J}$ and over all other indexes $k_j$ for $2 \le j \le J$. If the spatial support of all the patterns $S_p$ is smaller than a size $\Delta$, then one may choose J as the integer part of $\log_2(\Delta)$ and look for different patterns on different spatial patches $P_i$ of size $\Delta$. On each such domain, the matching unit 81 computes the pattern index $p_i$ and the translation $\tau_i$ which minimize the distance defined by (10), i.e.:

$$(p_i, \tau_i) = \arg\min_{\substack{1 \le p \le P \\ \tau \in P_i}} \|T_\tau I_J - I_{p,J}\|^2 \quad (11)$$

For each patch index i, the pattern index $p_i$ and its location $\tau_i$ in the input signal S(n) are provided at the output of the matching unit 81 as part of the pattern position array if a precision condition is fulfilled, e.g. $\|T_\tau I_J - I_{p,J}\|^2 \le \epsilon$ where $\epsilon$ is a precision parameter set by the user.

Figure 7:
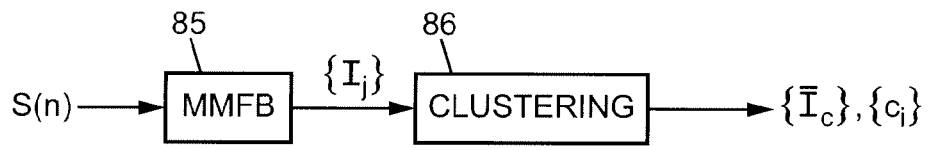

FIG. 7 shows an exemplary configuration of a clustering apparatus which processes a d-dimensional input signal S(n). A clustering system decomposes the signal into sub-parts that are homogeneous relatively to some criteria. It provides in output the signal locations that belong to the same cluster and a descriptor which characterizes each cluster. Image texture segmentation is an example of clustering problem.

The input signal S(n) is processed by the MMFB unit 85 which outputs an invariant spectrum $\{I_j\}_{1 \le j \le J}$ as described above. The clustering unit 86 finds spatial locations having similar invariant spectra and outputs a cluster number for each spatial location as well as an invariant spectrum descriptor. In an exemplary embodiment, the set of spatial indexes $k_0$ of the coarsest scale spectrum $I_J(k_0, k_1, \ldots, k_J)$ is segmented into several spatial patches $\{P_i\}_i$. A patch $P_i$ may be reduced to a single spatial location or could be a rectangular region. For each spatial patch $P_i$, we consider the array of coefficients $\{I_J(k_0, k_1, \ldots, k_J)\}_{k_0 \in P_i, k_1, \ldots, k_J}$ for $k_0$ in $P_i$ and all $k_1, \ldots, k_J$. These arrays for all i are distributed in C clusters identified by the clustering apparatus. For example, C being a parameter set by the user, the clustering unit 86 identifies a family of C centroids $\{\bar{I}_c\}_{1 \le c \le C}$ which are arrays $\{\bar{I}_c(k_0, k_1, \ldots, k_J)\}_{k_0 \in P_i, k_1, \ldots, k_J}$. In such example, the clustering also associates to each patch $P_i$ the cluster index $c(i)$ corresponding to the centroid $\bar{I}_{c(i)}$ which is the closest to the signal spectrum $\{I_J(k_0, k_1, \ldots, k_J)\}_{k_0 \in P_i, k_1, \ldots, k_J}$ in the patch $P_i$.

The clustering may be performed with any state of the art process such as, for example, an iterative K-mean clustering algorithm, computed with a Euclidean distance. The clustering unit 86 outputs the centroid vectors $\{\bar{I}_c\}_{1 \le c \le C}$ and the cluster index $c(i)$ for each patch $P_i$.

A clustering process may also be applied to several component signals $\{S_i(n)\}_{1 \le i \le L}$ of dimension d, which are grouped into clusters of similar signals. This type of clustering problem can be reduced to a clustering problem over a single signal that is constructed by aggregating all signals into a single signal. Each component signal $S_i(n)$, or part of it, is thus interpreted as a patch of a composite signal $S(n) = \{S_1(n), \ldots, S_L(n)\}$. The invariant spectra $I_{i,J}$ of the component signals $S_i(n)$ at the largest scale J are considered as the previously mentioned spectrum patches. For example, the clustering unit finds a family of C centroids $\{\bar{I}_c\}_{1 \le c \le C}$ and it associates to each patch $S_i$ the cluster index $c(i)$ corresponding to a centroid $\bar{I}_{c(i)}$ which is the closest to the signal spectrum $I_{i,J}$.

Figure 8:
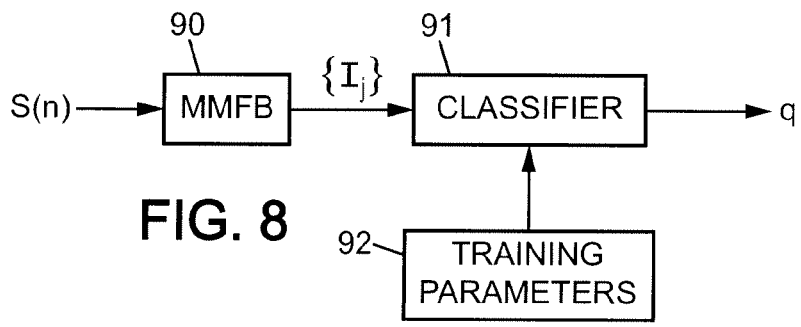

FIG. 8 shows an exemplary configuration of a pattern classification apparatus. The input signal S(n) is a d-dimensional signal with $d \ge 1$. The pattern classification apparatus outputs a label q which is an estimator of the class to which the input S(n) belongs. For example, if S(n) is an image of an object that belongs to an a priori defined set of Q objects, then there are Q possible classes and the label q may be chosen to be an integer between 1 and Q. Digit recognition in images is an example where there are Q=10 classes corresponding to the digits 0-9.

The input signal S(n) is processed by the MMFB unit 90, which outputs a multiscale invariant spectrum $\{I_j\}_{1 \le j \le J}$ as described above. A classifier unit 91 processes the multiscale invariant spectrum to output a class label q associated with the input signal S(n).

Any state of the art classifier may be used. In an exemplary embodiment, the classifier unit 91 comprises a support vector machine (SVM) operating on the vector corresponding to the coarsest invariant spectrum $I_J(k_0, k_1, \ldots, k_J)$. A conventional Gaussian kernel may be used in this SVM. Such a classifier unit is first trained on a sequence of $\tilde{L} \ge 2$ modulus spectra $\tilde{I}_{l,J}$ computed by means of the MMFB from a sequence of training signals $\{\tilde{S}_l\}_{1 \le l \le \tilde{L}}$ whose class labels are known. The training is implemented off-line to obtain training parameters which are stored in a memory 92 to which the classifier unit 91 accesses to process the invariant spectrum $I_J(k_0, k_1, \ldots, k_J)$ of the input signal $S(n)$. The SVM associates a class label q ($1 \leq q \leq Q$) to the modulus spectrum $I_J$ of a signal $S(n)$ computed by the MMFB unit 90.

Figure 9:
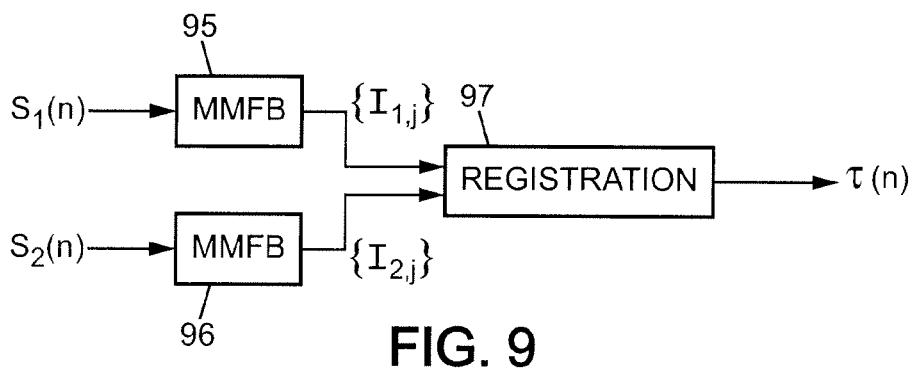

FIG. 9 shows an exemplary configuration of a pattern registration apparatus making use of the MMFB. The input of the registration apparatus comprises two signals $S_1(n)$ and $S_2(n)$. It outputs registration parameters which specify a deformation operator which maps $S_1(n)$ onto an approximation of $S_2(n)$.

In an exemplary implementation, this deformation is specified by a displacement array $\tau[n]$ such that $S_1(n-\tau[n])$ is most similar $S_2(n)$. When $S_1(n)$ and $S_2(n)$ are two consecutive images in a video sequence, $\tau[n]$ specifies the optical flow. If $S_1(n)$ and $S_2(n)$ are two stereo images, $\tau[n]$ is referred to as the disparity, from which the depth of image points in the scene can be computed. The measurement of such displacements is also needed to register a medical signal $S_1(n)$ over a reference signal $S_2(n)$ to find potential anomalies. In this context, $S_1(n)$ and $S_2(n)$ may be one-dimensional, two-dimensional, three-dimensional or four-dimensional signals (d=1, 2, 3 or 4).

The signals $S_1(n)$ and $S_2(n)$ are input respectively to two MMFB units 95, 96 which output respective multiscale invariant spectrum arrays $\{I_{1,j}\}_{1 \leq j \leq J}$ and $\{I_{2,j}\}_{1 \leq j \leq J}$. The registration of $S_1(n)$ relatively to $S_2(n)$ is performed by computing the registration of the multiscale invariant spectrum $\{I_{1,j}\}$ of $S_1(n)$ on the multiscale invariant spectrum $\{I_{2,j}\}$ of $S_2(n)$.

In an exemplary embodiment, the MMFB units 95, 96 compute a spatial spectrum with a MFB obtained with convolutions along the spatial variable $k_0$. The registration unit 97 computes for each j, a displacement $\tau_j[k_0]$ such that $I_{1,j}(k_0-\tau_j[k_0], k_1, \ldots, k_j)$ is most similar to $I_{2,j}(k_0, k_1, \ldots, k_j)$. For example, the displacement field $\tau_j$ is computed in order to minimize the Euclidean distance) $D_{1,2}^j(\tau_j)$:

$$D_{1,2}^j(\tau_j) = \sum_{k_0, k_1, \ldots, k_j} (I_{1,j}(k_0-\tau[k_0], k_1, \ldots, k_j) - I_{2,j}(k_0, k_1, \ldots, k_j))^2 \quad (12)$$

State of the art registration algorithms may be used by the unit 97 to compute the multiscale displacements $\tau_j(k_0)$. For example, the displacements are computed using a coarse-to-fine process. A displacement $\tau_J[k_0]$ is first computed by minimizing the Euclidean distance $D_{1,2}^J(\tau_J)$ at the coarsest scale j=J with any state of the art process. This displacement $\tau_J[k_0]$ is then used as an initial estimation to compute the displacement array $\tau_{J-1}[k_0]$ for the smaller index j=J-1 by minimizing $D_{1,2}^{J-1}(\tau_{J-1})$. Iteratively reducing j leads to progressively finer displacement estimations until $\tau_0[k_0]$ is obtained at the final scale index j=0. The registration unit 97 then outputs the displacement array $\tau(n)=\tau_0[k_0]$.

It will be appreciated that the embodiments described above are merely illustrations of the invention disclosed herein and that various modifications can be made without departing from the scope as defined in the appended claims.

For example, while the input signal $I_{j-1}(k_0, \ldots, k_{j-1})$ of a j-th stage for j>1 is shown to include the processed real signal generated by each modulus processing unit 35, 48, 71 of the preceding (j-1)-th stage in the embodiments lo depicted in FIGS. 3-5, it is also possible, in certain instances, not to fill completely the decomposition tree. In other words, it is possible to provide that only some of the modulus processing units of a (j-1)-th stage contribute to the input signal of the next stage.

The invention claimed is:

1. A digital filter bank having a number J of stages, where J is an integer greater than one, wherein for each integer j such that $1 \leq j \leq J$, the j-th stage comprises:

a plurality of filtering units each receiving an input signal of the j-th stage, including a low-pass filtering unit and at least one band-pass filtering unit using complex filtering coefficients; and following each band-pass filtering unit of the j-th stage, a respective modulus processing unit for generating a processed real signal as a function of squared moduli of complex output values of said band-pass filtering unit, wherein the input signal of the first stage is a digital signal supplied to the digital filter bank, and wherein for $1 < j \leq J$, the input signal of the j-th stage includes the processed real signal generated by at least one modulus processing unit of the (j-1)-th stage.

2. The digital filter bank as claimed in claim 1, wherein for $1 < j \leq J$, the input signal of the j-th stage includes the processed real signal generated by each modulus processing unit of the (j-1)-th stage.

3. The digital filter bank as claimed in claim 1, wherein the low-pass filtering unit is arranged to compute a convolution of the input signal of the j-th stage with real filtering coefficients.

4. The digital filter bank as claimed in claim 1, wherein each filtering unit in at least one of the stages includes a convolver for computing a convolution of the input signal of said one of the stages with filtering coefficients of said filtering unit, and wherein output values of said filtering unit are produced as a sub-sampled signal from the computed convolution.

5. The digital filter bank as claimed in claim 1, wherein each modulus processing unit following a respective band-pass filtering unit using complex filtering coefficients in at least one of the stages includes:

a complex-to-real transformer receiving the complex output values of said respective band-pass filtering unit and producing respective real values depending on the squared moduli of said complex output values; and a post-filter for low-pass filtering said real values and outputting the processed real signal for said modulus processing unit.

6. The digital filter bank as claimed in claim 1, wherein the filtering units of at least one of the stages include at least one further band-pass filtering unit using real high-pass filtering coefficients, followed by a processing unit for generating a processed real signal as a function of absolute values of real output values of said further band-pass filtering unit.

7. The digital filter bank as claimed in claim 6, wherein the processing unit following said further band-pass filtering unit includes a post-filter for low-pass filtering said absolute values of the real output values.

8. The digital filter bank as claimed in claim 1, wherein the low-pass filtering unit of said j-th stage uses real filtering coefficients $h_0^j(m)$, and each band-pass filtering unit of said j-th stage uses filtering coefficients $h_{k_j}^j(m)$ such that $h_{k_j}^j(m) = h^j(m) \cdot \exp(i \xi_{k_j}^j \cdot m)$ for a frequency offset value $\xi_{k_j}^j$, m being an index having a number d' of integer components where d' is a dimension of filtering of the input signal of the j-th stage, and $h^j(m)$ designating coefficients of a low-pass filter.

9. The digital filter bank as claimed in claim 1, wherein the input signal of the j-th stage for each integer j such that $1 \leq j \leq J$ is defined over j variable indexes $k_0, \ldots, k_{j-1}$, where:

$k_0$ is an index having d integer components, with $d \geq 1$ being the dimension of the digital signal supplied to the digital filter bank; and for $1 \leq l < j$, $k_l$ is an integer index associated with the plurality of filtering units of the l-th stage.

10. The digital filter bank as claimed in claim 9, wherein for $1 \leq j \leq J$, each of the filtering units of the j-th stage is arranged to compute a convolution of the input signal of the j-th stage with respective filtering coefficients along a single variable index $k_j$, with $0 \leq l < j$.

11. The digital filter bank as claimed in claim 9, wherein, for an integer l such that $1 \leq l < J$, the filtering units of the l-th stage are arranged to compute convolutions of the input signal of the l-th stage with respective filtering coefficients along the variable index $k_0$, wherein the filtering units of said l-th stage include:
   a first band-pass filtering unit using filtering coefficients $h_1^l(k_0)$; and
   at least one second band-pass filtering unit designated by a respective integer index k, using respective filtering coefficients $h_k^l(k_0) = G_k[h_1^l(k_0)]$ where $G_k$ is an operator acting on d-dimensional discrete signals and belonging to a group of operators.

12. The digital filter bank as claimed in claim 11, wherein the band-pass filtering units of at least one j-th stage, with $j > l$, are arranged to compute respective convolutions of the input signal of the j-th stage with respective filtering coefficients along the variable index $k_j$.

13. A pattern detection method, comprising:
   transforming a digital signal into a spectrum using a digital filter bank; and
   applying a pattern matching process to at least part of said spectrum and to at least one pre-stored spectrum associated with a respective pattern in order to detect said pattern in the digital signal,
wherein the digital filter bank has a number J of stages, where J is an integer greater than one, wherein for each integer j such that $1 \leq j \leq J$, the j-th stage comprises:
   a plurality of filtering units each receiving an input signal of the j-th stage, including a low-pass filtering unit and at least one band-pass filtering unit using complex filtering coefficients; and
   following each band-pass filtering unit of the j-th stage, a respective modulus processing unit for generating a processed real signal as a function of squared moduli of complex output values of said band-pass filtering unit,
wherein said digital signal is the input signal of the first stage of the digital filter bank, and wherein for $1 < j \leq J$, the input signal of the j-th stage includes the processed real signal generated by at least one modulus processing unit of the (j−1)-th stage.

14. A clustering method, comprising:
   transforming a digital signal into a spectrum using a digital filter bank; and
   applying a clustering process to at least part of said spectrum to identify a plurality of clusters and associate each of a plurality of patches of said spectrum with a respective one of the clusters, wherein the patches correspond to different regions of the spectrum or to at least part of different component spectra if the digital signal is made of a plurality of component signals transformed into respective component spectra using the digital filter bank,
wherein the digital filter bank has a number J of stages, where J is an integer greater than one, wherein for each integer j such that $1 \leq j \leq J$, the j-th stage comprises:
   a plurality of filtering units each receiving an input signal of the j-th stage, including a low-pass filtering unit and at least one band-pass filtering unit using complex filtering coefficients; and
   following each band-pass filtering unit of the j-th stage, a respective modulus processing unit for generating a processed real signal as a function of squared moduli of complex output values of said band-pass filtering unit,
wherein said digital signal is the input signal of the first stage of the digital filter bank, and wherein for $1 < j \leq J$, the input signal of the j-th stage includes the processed real signal generated by at least one modulus processing unit of the (j−1)-th stage.

15. A pattern classification method, comprising:
   transforming a digital signal into a spectrum using a digital filter bank; and
   applying a pattern classification process to at least part of said spectrum and to pre-stored training parameters corresponding to a plurality of pattern classes in order to associate the digital signal with one of said pattern classes,
wherein the digital filter bank has a number J of stages, where J is an integer greater than one, wherein for each integer j such that $1 \leq j \leq J$, the j-th stage comprises:
   a plurality of filtering units each receiving an input signal of the j-th stage, including a low-pass filtering unit and at least one band-pass filtering unit using complex filtering coefficients; and
   following each band-pass filtering unit of the j-th stage, a respective modulus processing unit for generating a processed real signal as a function of squared moduli of complex output values of said band-pass filtering unit,
wherein said digital signal is the input signal of the first stage of the digital filter bank, and wherein for $1 < j \leq J$, the input signal of the j-th stage includes the processed real signal generated by at least one modulus processing unit of the (j−1)-th stage.

16. A pattern registration method, comprising:
   transforming a first digital signal into a first spectrum and a second digital signal into a second spectrum using first and second digital filter banks, respectively; and
   applying a pattern registration process to at least part of said first and second spectra in order to identify displacements mapping the first signal onto the second signal,
wherein each of the first and second digital filter banks has a number J of stages, where J is an integer greater than one, wherein for each integer j such that $1 \leq j \leq J$, the j-th stage of each of the first and second digital filter banks comprises:
   a plurality of filtering units each receiving an input signal of the j-th stage of said filter bank, including a low-pass filtering unit and at least one band-pass filtering unit using complex filtering coefficients; and
   following each band-pass filtering unit of the j-th stage of said filter bank, a respective modulus processing unit for generating a processed real signal as a function of squared moduli of complex output values of said band-pass filtering unit,
wherein said first digital signal is the input signal of the first stage of the first digital filter bank, wherein said second digital signal is the input signal of the first stage of the second digital filter bank, and wherein for $1 < j \leq J$, the input signal of the j-th stage of each of the first and second digital filter banks includes the processed real signal generated by at least one modulus processing unit of the (j−1)-th stage of said filter bank.

* * * * *